Figure 3:
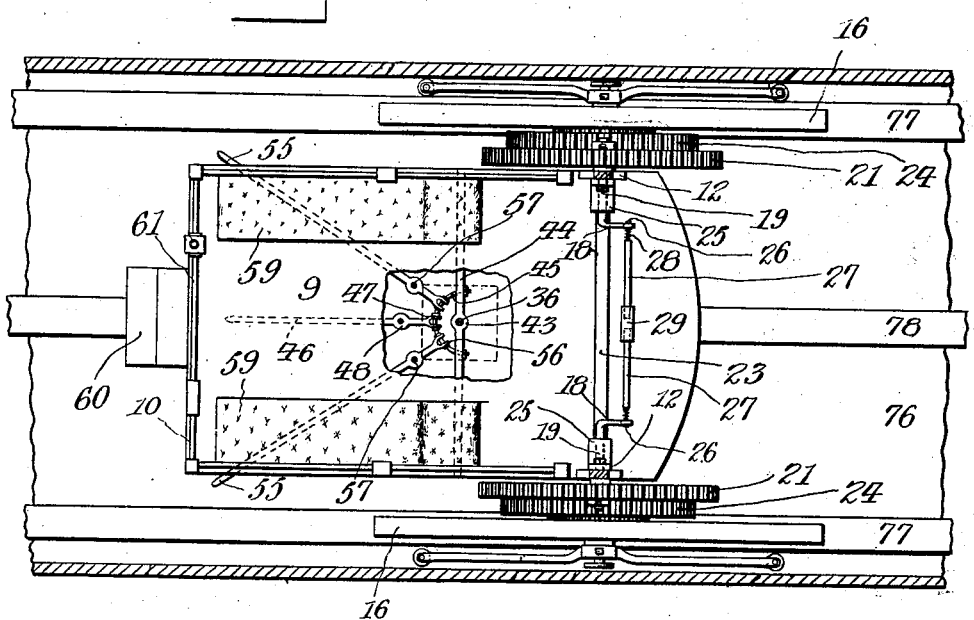

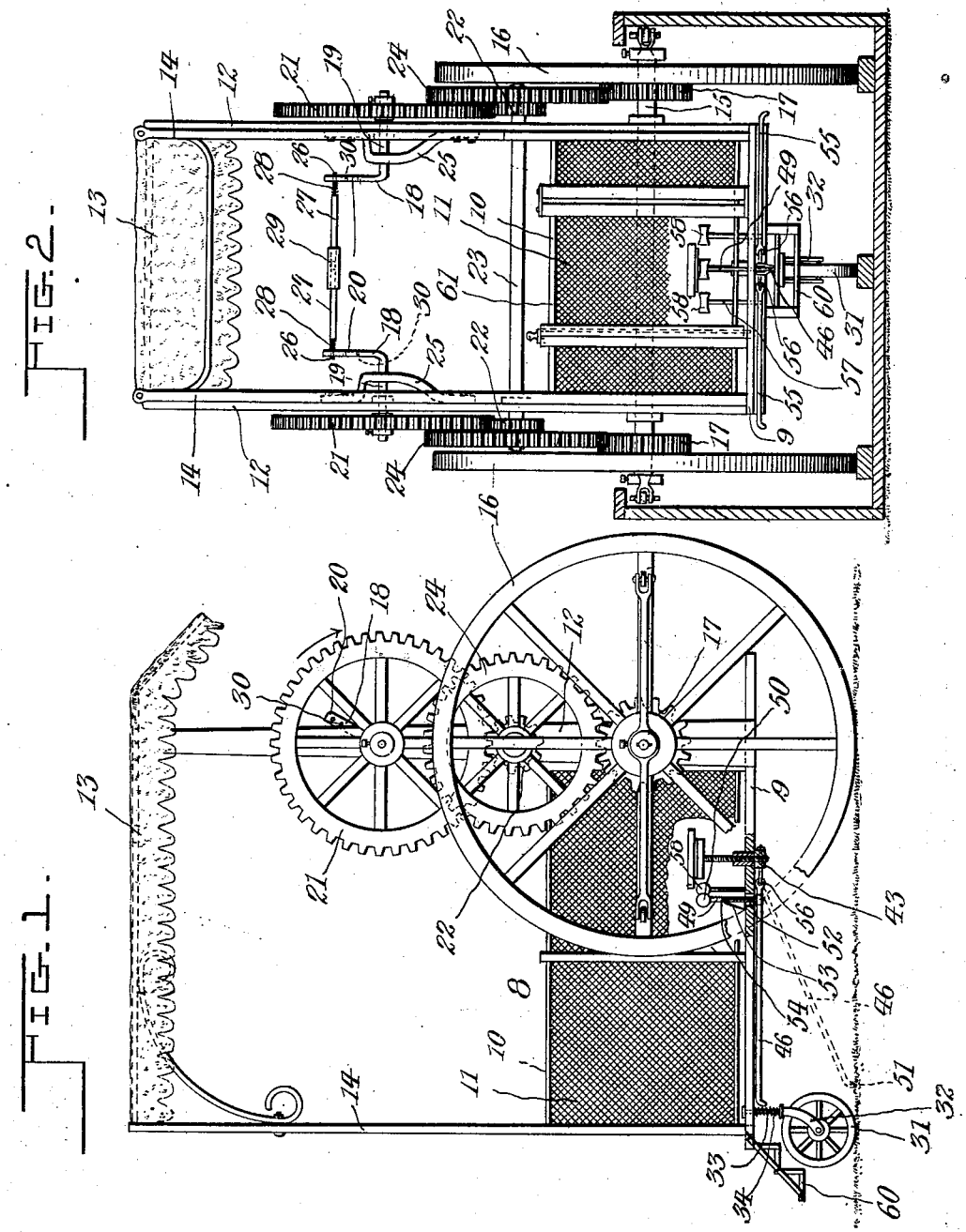

No. 754,635. PATENTED MAR. 15, 1904.
JOSEPH-CAJÉTAN BÉRUBÉ.
SELF PROPELLED VEHICLE.
APPLICATION FILED APR. 23, 1903.
NO MODEL. 2 SHEETS—SHEET 2.

Witnesses:
Fred Page
F. D. Ammen

Joseph C. Bérubé, Inventor,
By Marion & Marion
Attorneys

No. 754,635. Patented March 15, 1904.

UNITED STATES PATENT OFFICE.

JOSEPH-CAJÉTAN BÉRUBÉ, OF ST. DAMASE, CANADA.

SELF-PROPELLED VEHICLE.

SPECIFICATION forming part of Letters Patent No. 754,635, dated March 15, 1904.

Application filed April 23, 1903. Serial No. 153,945. (No model.)

*To all whom it may concern:*

Be it known that I, JOSEPH-CAJÉTAN BÉRUBÉ, a subject of the King of Great Britain, residing at St. Damase, county of Rimouski, Province of Quebec, Canada, have invented certain new and useful Improvements in Self-Propelled Vehicles; and I do hereby declare that the following is a full, clear, and exact description of the invention, such as will enable others skilled in the art to which it appertains to make and use the same.

My invention relates to self-propelled vehicles; and my object is to produce a vehicle of this kind with mechanism whereby manual force may be applied to the best advantage for driving the same. The invention concerns itself too with arrangements for enhancing the dirigibility of the vehicle.

While the invention is primarily intended for use by men of ordinary physical strength and as a useful means of locomotion from place to place out of doors, it would also readily adapt itself for embodiment in such a form as would be useful within doors for invalids and persons similarly incapacitated. In this connection it would seem that it should be very useful in and around hospitals and hospital-grounds—as, for instance, where a patient's room or ward was located at some distance from a sunny porch to which the invalid could repair at certain times. Then the axle 23 is in two parts, and a chair or bed takes the place of the stool.

In its general construction the vehicle comprises a body, including a platform or floor, which body is mounted upon a pair of driving-wheels, and these driving-wheels are connected with certain driving mechanism, including a crank or cranks, by means of which the person using the vehicle may apply his strength advantageously to advance the vehicle. While under normal conditions both of the said driving-wheels will be under the influence of the driving force, arrangement is made whereby they may be operated independently, which further increases, in a marked degree, the dirigible capacities of the vehicle, as will be readily understood. The construction also includes other arrangements for the same purpose to better adapt it for use under other circumstances.

The invention further consists in the construction and combination of parts to be more fully described hereinafter, and definitely set forth in the claims.

In the drawings, which fully illustrate my invention, Figure 1 is a side elevation of the same, certain parts being broken away, however, and shown in section for the sake of clearness. Fig. 2 represent the invention in rear elevation, a portion being represented as removed to disclose certain parts of the machine which would be otherwise concealed. Fig. 3 represents the invention substantially in plan, certain parts being broken away, as will appear, and with certain parts shown in section.

Throughout the drawings and specification the same numerals of reference indicate like parts.

Referring more particularly to the parts, 8 represents the body of the vehicle, which comprises a suitable floor or platform 9, about which there is erected a rail or guard 10, which latter construction may include a net 11 of coarse wire-mesh or similar material. Near its forward extremity to this platform 9 there are attached standards 12, arranged, respectively, at either side and opposite each other, as shown, the upper extremities of these standards supporting a suitable canopy or awning 13, which awning is supported at the rear of the vehicle by stanchions 14, which constitute extensions of the rail construction aforesaid.

The standards 12 afford support for a fixed main axle 15, which passes through the body of the vehicle and which carries, loosely mounted upon its extremities, the driving-wheels 16. Upon these driving-wheels 16 coaxial pinions 17 are rigidly mounted, and these afford means for driving the wheels through mechanism which will now be described.

At a suitable height above the main axle the standards 12 afford bearing for a pair of oppositely-disposed cranks 18, which cranks comprise shanks or spindles 19 and integral arms 20, as shown. Upon the outer extremities of these spindles 19, which, by the way, project outwardly beyond the standards 12, there are rigidly mounted gears 21, which mesh with pinions 22, loosely mounted upon an auxiliary axle 23. Gears 24, which are rigid with the pinions 22, mesh, respectively, with the aforesaid pinions 17 on the main axle. From this arrangement it should readily appear that if the cranks 18 were revolved in the direction of the arrow shown in Fig. 1 the vehicle could be advanced, and evidently the proportioning of the gearing would operate to give the driving-wheels 16 an increased velocity ratio. In order to provide additional bearing and rigidity at the cranks 18, the inner sides of the standards 12 are provided with brackets 25, through which pass the aforesaid spindles or shanks 19, as indicated. The construction connecting the arms 20 of the cranks include removable pins or studs 26, which project toward each other. These studs carry tubular members 27, surrounding them, which are impelled toward each other by helical springs 28, which normally maintain them, so that their extremities lie but a short distance apart, as indicated. Surrounding the adjacent extremities of these tubular members there is provided a sleeve, handle, or coupling 29, which is normally maintained in the position in which it is shown in Fig. 2, but which may be slid along in either direction, so as to envelop only one of the tubular members 27, allowing the other tubular member to become perfectly free to move, as will be readily understood. From this arrangement it should readily appear that the two cranks may be operated in unison or their connection may be broken in the manner described, whereupon they may be operated independently. Such an arrangement evidently greatly increases the facility with which the vehicle may be actuated or turned about. In order to meet the requirements of different persons or different conditions, arms 20 may be provided with a plurality of openings 30, oppositely disposed, as indicated, which afford means for changing the position of the studs 26 and the parts connected therewith.

At the rear the vehicle is provided with a trailer or wheel 31, the bracket 32 for which terminates in a suitable pintle 33, which turns freely in the metal frame supporting the floor 9, and a spring 34 may be provided at this point to make the vehicle run more easily and smoothly. A transverse brace or bar 44 extends from side to side of the body just beneath the floor, as indicated. At its central point 43 this brace has attached thereto a semicircular yoke 45, disposed at the rear side thereof. There is provided a centrally-disposed brake-bar 46, the inner extremity whereof is provided with a bifurcated head 47, pivotally mounted upon the aforesaid yoke 45, so that the bar may be rotated in a vertical plane, as will be readily understood. At a short distance from its inner extremity this bar is enlarged into an internally-threaded boss 48, to which is attached an upwardly-projecting adjustable threaded pin or shank 49, which terminates in a head 50, which is adapted to be depressed by the operator's foot, so as to hold the lower extremity of the brake-bar 46 against the roadway, as indicated in the dotted lines of Fig. 1. The extremity of this bar 46 may have a suitable downwardly-turned nose 51 to increase its efficiency, as will be readily understood. The shank 49 passes through an opening 52, provided in the floor for that purpose, and a resilient member 53 coöperates with a notch or catch 54 upon the side of the shank 49, so that the bar 46 may be normally maintained in the elevated position in which it is shown in Fig. 1. This brake-bar is especially useful in hill-climbing to prevent the backward descent of the vehicle when it is not being advanced. Under other conditions it may be operated simply as a brake.

In order to guide the vehicle without disconnecting the cranks in the manner which has been described, there are provided a pair of inclined or laterally-disposed guiding brakes or bars 55, which bars are substantially similar in their construction to the bar 46 already described, being provided with bifurcated inner extremities 56, which are carried by the aforesaid yoke 45, and they are operated in the same manner as the bar 46 by means of the shanks 57, which terminate above in heads 58, which heads are similar to the head 50 of the shank 49. The body of the vehicle may be provided with cushion seats or benches 59 of sufficient size to accommodate several people, so that the vehicle may carry passengers other than the one driving the vehicle.

As illustrated, the floor 9 of the vehicle is at a slight elevation, and for the purpose of facilitating access to the body of the vehicle there are provided at the rear suitable steps 60, which lead up to a gate 61 through the aforesaid guard 10.

In the operation of the vehicle it should be understood that the operator of the same stands upon the stool 38. Then by rotating the cranks 18 the vehicle will be advanced, as will be readily understood. Where it is desired to turn the vehicle quickly, the sleeve 29 is slid to either side, whereby the two cranks become disconnected, and after this has taken place either or both of the cranks may be rotated, effecting a rapid change in the direction of the vehicle. It is expected, however, that this mode of directing the vehicle will be used only where it is necessary to turn with extreme facility and rapidity. The direction of the vehicle may be guided by means of the members 55, which may be depressed when desired by the operator's foot in a manner which has been described, so that they may afford a substantial resistance to the advance of the vehicle on either side of its central line and so that they bring about a change in the direction of the same, as will be readily understood. In ascending a hill the member 46 is brought into use, being operated by the foot, its extremity being adapted to dig into the earth and prevent a retrogressive movement of the vehicle.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

What I claim as new, and desire to secure by Letters Patent, is—

1. A self-propelled vehicle comprising in combination, a pair of oppositely-disposed driving-wheels, a pair of cranks adapted respectively to drive said wheels, and a removable coupling between said cranks.

2. In a self-propelled vehicle, in combination, a pair of oppositely-disposed driving-wheels, a pair of cranks respectively adapted to drive said wheels, members carried by said cranks which project toward each other, and another member movably mounted upon said last members and affording means for connecting or disconnecting the same.

3. In a self-propelled vehicle, in combination, a pair of oppositely-disposed driving-wheels, a pair of oppositely-disposed cranks, mechanisms connecting each of said cranks with said wheels to drive the same, members carried by said cranks and projecting toward each other, and a sleeve slidably mounted upon said members and which may couple the same.

4. In a self-propelled vehicle, in combination, a pair of oppositely-disposed driving-wheels, independent gear mechanisms for driving said wheels, a pair of cranks respectively adapted to actuate said mechanisms, laterally-projecting members carried by the arms of said cranks, the extremities whereof may lie adjacent, springs impelling said members toward each other, and a sleeve movable longitudinally thereupon and which may connect said members.

5. In a self-propelled vehicle, in combination, a pair of oppositely-disposed driving-wheels, independent gear mechanisms for driving said wheels, cranks respectively adapted to actuate said mechanisms, members carried by the arms of said cranks and which project toward each other, springs constraining the same, a movable sleeve mounted upon said members and which may connect the same, and means whereby said members may be attached to the arms of said cranks in a plurality of positions.

In witness whereof I have hereunto set my hand in the presence of two witnesses.

JOSEPH-CAJÉTAN BÉRUBÉ.

Witnesses:
   DOLPHIS SALOMON GIGUÈRE,
   CLÉOPHAS SAINDON.